United States Patent Office 3,082,266

Patented Mar. 19, 1963

1

3,082,266

PREPARATION OF 1,2-DIARYLETHANES

Herman S. Bloch, Skokie, and Edward M. Geiser, Downers Grove, Ill., assignors, by mesne assignments, to Universal Oil Products Company, Des Plaines, Ill., a corporation of Delaware No Drawing. Filed Jan. 19, 1959, Ser. No. 787,369
11 Claims. (Cl. 260—668)

This application is a continuation-in-part of our copending application Serial No. 546,823, filed November 14, 1955, now abandoned.

This invention relates to a process for preparing a diarylalkane and particularly to a method of preparing a 1,2-diarylethane. More particularly the invention discloses a process for preparing p,p'-1,2-ditolylethane.

The increased use of terephthalic acid as an intermediate in the preparation of synthetic fibers of the glycol-terephthalic type, such as those fibers known in the trade as Dacron, terylene, etc., has increased the demand for para-xylene from which the terephthalic acid is prepared. Heretofore the separation of para-xylene from its ortho- and meta-isomers has been relatively expensive due to difficulties encountered in the process involving the separation of the aforementioned isomers. For example, one method of preparing para-xylene from ethylbenzene and isomers of said para-xylene is to subject the mixture of o-xylene, m-xylene, p-xylene and ethylbenzene to fractional distillation. However, inasmuch as para-xylene, meta-xylene and ethylbenzene all boil within a 3° C. range of each other, separation into the various components by fractional distillation is rather difficult to accomplish.

One method of operation is to distill out the o-xylene which has a boiling point of approximately 5–6° C. above that of the other three components of the mixture. The para- and meta-xylene along with the ethylbenzene will then be separated into several fractions and para-xylene may then be separated out by crystallization from cuts containing the highest percentage.

Another method of separating the para-xylene from the unwanted isomers is to displace the eutectic compositions of para- and meta-xylene by the addition of a co-crystallizing agent such as carbon tetrachloride followed by cooling, the para-xylene and carbon tetrachloride thereby separating out of the mixture, and thereafter recovering said para-xylene by fractional distillation of the para-xylene-carbon tetrachloride mixture.

Still another method of recovering para-xylene is to partially sulfonate the mixture, separate the unsulfonated layer from the reaction mixture and crystallize the para-xylene from the mixture by lowering the temperature.

It can readily be seen from the above description that the process for obtaining relatively pure para-xylene for the manufacture of terephthalic acid involves many steps which, as hereinbefore set forth, are relatively difficult and expensive to accomplish.

It is therefore an object of this invention to provide a relatively inexpensive and novel process for obtaining diaryl-substituted alkanes which can thereafter be converted to desired compounds such as aryl dicarboxylic acids.

A further object of this invention is to provide a process for obtaining 1,2-diarylethanes by condensing an alkyl substituted aromatic hydrocarbon with a 1,2-disubstituted ethane derivative.

A specific object of this invention is to provide a process for obtaining p,p'-1,2-ditolylethane by condensing toluene with an ethylene derivative such as ethylene glycol.

One embodiment of this invention resides in a process for the preparation of a 1,2-dialkarylethane which comprises condensing an alkyl substituted aromatic hydrocarbon with a 1,2-disubstituted ethane derivative selected from the group consisting of ethylene glycol, polyethylene glycol, ethylene oxide and dioxane, said alkyl substituted aromatic hydrocarbon being present in a molar excess over said 1,2-disubstituted ethane derivative, in the presence of an acid catalyst, said catalyst being present in a molar excess over said 1,2-disubstituted ethane derivative, at a temperature in the range of from about 50° to about 225° C., and recovering the resultant 1,2-dialkarylethane.

Another embodiment of the invention resides in a process for the preparation of a 1,2-ditolylethane which comprises condensing toluene with ethylene glycol, said toluene being present in a molar excess in the range of from about 2 to about 10 moles over said ethylene glycol, in the presence of an aryl sulfonic acid, said acid being present in a molar excess in the range of from about 2 to about 10 moles over said ethylene glycol, at a temperature in the range of from about 100° to about 125° C., and recovering the resultant 1,2-ditolylethane.

A specific embodiment of the invention resides in a process for the preparation of a 1,2-ditolylethane which comprises condensing toluene with ethylene glycol, said toluene being present in a molar excess in the range of from about 2 to about 10 moles over said ethylene glycol, in the presence of toluenesulfonic acid, said acid being present in a molar excess in the range of from about 2 to about 10 moles over said ethylene glycol, at a temperature in the range of from about 100° to about 125° C., and recovering the resultant 1,2-ditolylethane.

Other objects and embodiments referring to alternative 1,2-disubstituted ethane derivatives and alternative catalysts will be found in the following further detailed description of the invention.

As hereinbefore set forth it is now proposed that p,p'-1,2-ditolylethane which can be converted to p-xylene or directly oxidized to terephthalic acid may be prepared by condensing toluene with a 1,2-disubstituted ethane derivative. In the preferred embodiment of the invention the alkyl substituted aromatic hydrocarbon such as toluene which is condensed with an ethane derivative is present in a molar excess ranging from about 2 to about 10 moles of aromatic hydrocarbon over the number of moles of ethylene groups ($—CH_2—CH_2—$) present in said ethane derivative. 1,2-disubstituted ethane derivatives, or ethylene compounds, as they are alternatively called herein by virtue of the presence of the $$—CH_2—CH_2—$$

grouping therein, which may be used in this invention include ethylene glycol, polyethylene glycols, ethylene oxide, dioxane, etc. Alkyl substituted aromatic hydrocarbons which may be used include toluene, ethylbenzene, propylbenzene, etc. It is understood that the above enumerated alkyl substituted aromatic hydrocarbons and ethylene compounds are only examples of the class, and that the present invention is not necessarily limited thereto.

The condensation of the alkyl substituted aromatic hydrocarbon and the ethane derivative will take place in the presence of an acid catalyst, preferably the Bronsted type acids, said catalysts including, for example, inorganic acids such as hydrogen fluoride, sulfuric acid, phosphoric acid, hydrochloric acid, etc.; alkyl sulfonic acids such as methylsulfonic acid, ethylsulfonic acid, propylsulfonic acid, etc.; aryl sulfonic acids such as benzenesulfonic acid, toluenesulfonic acid, ethylbenzenesulfonic acid, etc., and the like.

The use of acids of the type hereinbefore set forth will result in the formation of a p,p'-diarylethane which is the desired configuration of the reaction products of this invention. It is known from the prior art that alkylene oxides can be condensed with hydrocarbons in the presence of Lewis type acids such as acid acting halides and specifically Friedel-Crafts condensing catalysts. However, the use of these catalysts which are acid acting will result in a mixture of isomers of the diarylalkanes, the predominating isomer being the m,m'-diarylalkane. Therefore, it was totally unexpected that the use of an acid catalyst of the Bronsted type would result in the formation of a relatively large amount of the p,p'-diarylalkane rather than a mixture of isomeric products with the meta-type predominating.

The amount of the acid catalyst which is used in this reaction will depend upon the ethane derivative which is reacted with the alkyl substituted aromatic hydrocarbon. In the preferred embodiment of the invention the catalyst is present in a molar excess over the number of oxygen atoms which are present in the ethylene compound, this excess being in the range of from about 2 to about 10 moles of catalyst per mole of ethane derivative. This excess is preferred due to the fact that water is formed as a result of the condensation, said water then having a tendency to dilute the catalyst to a point where the strength of said catalyst is reduced and the catalyst becomes inoperative. It is further proposed, as one embodiment of the invention, that the amount of acid catalysts required could be reduced by withdrawing a water-alkyl aromatic hydrocarbon azeotrope in order to remove water from the system, separating the alkyl aromatic hydrocarbon from the azeotrope condensate, and continuously recycling the alkyl substituted aromatic hydrocarbon to the reaction vessel.

The condensation of the alkyl substituted aromatic hydrocarbon such as toluene with the ethylene compound will take place at a temperature in the range of from about 50° to about 225° C., and preferably at the reflux temperature of the alkyl substituted aromatic hydrocarbon, that is, in a range of from about 105° to about 115° C., if toluene is the lowest boiling component present in the mixture and correspondingly higher when other alkyl substituted hydrocarbons are used. At higher temperatures, elevated pressures in the range of from about 2 to about 100 atmospheres or more may be employed, the pressure being that which is sufficient to maintain at least a major proportion of the reactants in liquid phase.

The process of the present invention may be effected in any suitable manner and may comprise either a batch or continuous type operation. When a batch type operation is used, a quantity of the starting materials, namely, the alkyl substituted aromatic hydrocarbon such as toluene and the ethylene compound are placed in a suitable alkylating apparatus containing the desired acid catalyst. The vessel is then heated to the desired temperature in the range hereinbefore set forth and maintained thereat for a predetermined residence time. At the end of this time the vessel and contents thereof are cooled to room temperature and the reaction product is separated by conventional means, such as, for example, fractional distillation, etc.

Another type of operation which may be used is the continuous type. The starting materials are continuously introduced into a reaction vessel maintained at the suitable operating conditions of temperature and pressure. The reaction vessel may comprise an unlined vessel or coil, or may contain an adsorbent packing material such as fire brick, alumina, dehydrated bauxite and the like. The starting materials may be introduced into said vessel through separate lines or, if so desired, may be admixed before admission to the vessel and continuously charged thereto in a single continuous stream. The acid catalyst is introduced into the vessel through separate means. If so desired, the water-alkyl aromatic hydrocarbon azeotropic mixture may be continuously withdrawn from the vessel, the water removed by fractional distillation and the alkyl aromatic hydrocarbon portion of the mixture again charged to the vessel by separate means or by commingling with the original feed stock. After a predetermined residence time, the condensation product is continuously withdrawn from the vessel, separated from the catalyst, unreacted alkyl substituted aromatic hydrocarbon such as toluene and ethylene compound, and purified by conventional means hereinbefore set forth. The latter three compounds may then be recycled to the reaction vessel as a portion of the original feed stock. In the event that some o,o' or o,p'-1,2-ditolylethane is formed the impurity may be separated from the desired reaction product after said product has been oxidized to terephthalic acid inasmuch as the phthalic acid formed by the oxidation of o,o' or o,p'-1,2-ditolylethane is easily separable by sublimation from terephthalic acid.

The following examples are given to illustrate the process of the present invention, which, however, are not intended to limit the generally broad scope of the present invention in strict accordance therewith.

*Example I*

A mixture of 920 g. of toluene and 62 g. of ethylene glycol are placed in a condensation flask along with 200 g. of toluenesulfonic acid. The flask is heated to a reflux temperature, varying between about 84° and 115° C., and maintained thereat for a period of approximately 24 hours. At the end of this time the flask and contents thereof are cooled to room temperature, the reaction product is separated from the catalyst, washed and dried, and the mixture then subjected to fractional distillation whereby the desired p,p'-1,2-ditolylethane is recovered.

*Example II*

A mixture of 44 g. of ethylene oxide and 460 g. of toluene, comprising a 5:1 mole ratio of said toluene to said ethylene oxide, is introduced slowly into a well-stirred condensation flask containing 460 g. of toluene and 250 g. of 85% phosphoric acid. The flask is heated to a temperature in the range of from about 105° to about 110° C. and maintained thereat for a period of approximately 20 hours. At the end of this time the flask and contents thereof are allowed to cool to room temperature and the reaction product separated from the catalyst. The reaction product is then washed, dried and subjected to fractional distillation. A cut boiling in the range of from about 170° C. to about 180° C. at 15 mm. pressure, comprising p,p'-1,2-ditolylethane, is then separated out. From this cut pure p,p'-1,2-ditolylethane, M.P. 84–85° C., is recovered by recrystallization from alcohol. The yield of this product, however, is only 18% of the theoretical.

*Example III*

The procedure of Example II is repeated except that a pressure autoclave is used, the catalyst is 140 g. of anhydrous hydrogen fluoride, and the stirring time at 105–110° is 10 hours. The yield of p,p'-1,2-ditolylethane is markedly improved over that obtained with phosphoric acid—almost 30% of the theoretical.

*Example IV*

In this experiment 920 g. of toluene and 62 g. of ethylene glycol are placed in a condensation flask along with 200 g. of methylsulfonic acid. The flask is then heated to a reflux temperature which varies from about 84° to about 115° C. and maintained thereat for a period of approximately 24 hours. At the end of this time the flask and contents thereof are cooled to room temperature, the reaction product is separated from the catalyst layer, washed with water, dried and subjected to fractional distillation; the cut comprising p,p'-1,2-ditolylethane is separated and recovered therefrom.

*Example V*

A mixture of 920 g. of toluene and 88 g. of dioxane is placed in a condensation flask along with 200 g. of toluenesulfonic acid. The flask is heated to a reflux temperature, varying from about 84° to 115° C., and maintained thereat for a period of approximately 24 hours. At the end of this time the flask and contents thereof are cooled to room temperature, the reaction product is separated from the catalyst, washed, dried and subjected to fractional distillation whereby the desired p,p'-1,2-ditolylethane is recovered.

We claim as our invention:

1. A process for the preparation of a 1,2-diarylethane which consists of the steps of condensing an alkyl substituted aromatic hydrocarbon with a 1,2-disubstituted ethane derivative selected from the group consisting of ethylene glycol, polyethylene glycol, ethylene oxide and dioxane, said alkyl substituted aromatic hydrocarbon being present in a molar excess over said ethane derivative, in the presence of an acid catalyst, said catalyst being present in a molar excess over said ethane derivative, at a temperature in the range of from about 50° to about 225° C., and recovering the resultant 1,2-diarylethane.

2. A process for the preparation of a 1,2-ditolylethane which consists of steps of condensing toluene with an ethylene compound selected from the group consisting of ethylene glycol, polyethylene glycol, ethylene oxide and dioxane, said toluene being present in a molar excess over said ethylene compound, in the presence of an acid catalyst, said catalyst being present in a molar excess over said ethylene compound, at a temperature in the range of from about 50° to about 225° C., and recovering the resultant 1,2-ditolylethane.

3. A process for the preparation of a 1,2-ditolylethane which comprises condensing toluene with an ethylene compound selected from the group consisting of ethylene glycol, polyethylene glycol, ethylene oxide and dioxane, said toluene being present in an excess over said ethylene compound, in the presence of an alkyl sulfonic acid, said acid being present in a molar excess over said ethylene compound, at a temperature in the range of from about 50° to about 225° C., and recovering the resultant 1,2-ditolylethane.

4. A process for the preparation of a 1,2-ditolylethane which comprises condensing toluene with an ethylene compound selected from the group consisting of ethylene glycol, polyethylene glycol, ethylene oxide and dioxane, said toluene being present in an excess over said ethylene compound, in the presence of an aryl sulfonic acid, said acid being present in a molar excess over said ethylene compound, at a temperature in the range of from about 50° to about 225° C., and recovering the resultant 1,2-ditolylethane.

5. A process for the preparation of a 1,2-ditolylethane which comprises condensing toluene with ethylene glycol, said toluene being present in a molar excess in the range of from about 2 to about 10 moles over said ethylene glycol, in the presence of an aryl sulfonic acid, said acid being present in a molar excess in the range of from about 2 to about 10 moles over said ethylene glycol, at a temperature in the range of from about 100° to about 125° C., and recovering the resultant 1,2-ditolylethane.

6. A process for the preparation of a 1,2-ditolylethane which comprises condensing toluene with dioxane, said toluene being present in a molar excess in the range of from about 2 to about 10 moles over said dioxane, in the presence of an aryl sulfonic acid, said acid being present in a molar excess in the range of from 2 to about 10 moles over said dioxane, at a temperature in the range of from about 100° to about 125° C., and recovering the resultant 1,2-ditolylethane.

7. A process for the preparation of a 1,2-ditolylethane which comprises condensing toluene with ethylene glycol, said toluene being present in a molar excess in the range of from about 2 to about 10 moles over said ethylene glycol, in the presence of toluenesulfonic acid, said acid being present in a molar excess in the range of from aout 2 to about 10 moles over said ethylene glycol, at a temperature in the range of from about 100° to about 125° C., and recovering the resultant 1,2-ditolylethane.

8. A process for the preparation of a 1,2-ditolylethane which comprises condensing toluene with ethylene glycol, said toluene being present in a molar excess in the range of from about 2 to about 10 moles of said ethylene glycol, in the presence of methylsulfonic acid, said acid being present in a molar excess in the range of from about 2 to about 10 moles over said ethylene glycol, at a temperature in the range of from about 100° to about 125° C., and recovering the resultant 1,2-ditolylethane.

9. A process for the preparation of a 1,2-ditolylethane which comprises condensing toluene with ethylene glycol, said toluene being present in a molar excess in the range of from about 2 to about 10 moles of said ethylene glycol, in the presence of hydrogen fluoride, said hydrogen fluoride being present in a molar excess in the range of from about 2 to about 10 moles over said ethylene glycol, at a temperature in the range of from about 100° to about 125° C., and recovering the resultant 1,2-ditolylethane.

10. A process for the preparation of a 1,2-ditolylethane which comprises condensing toluene with ethylene glycol, said toluene being present in a molar excess in the range of from about 2 to about 10 moles of said ethylene glycol, in the presence of phosphoric acid, said acid being present in a molar excess in the range of from about 2 to about 10 moles over said ethylene glycol, at a temperature in the range of from about 100° to about 125° C., and recovering the resultant 1,2-ditolylethane.

11. A process for the preparation of p,p'-1,2-ditolylethane which comprises condensing toluene with ethylene glycol, said toluene being present in a molar excess in the range of from about 2 to about 10 moles over said ethylene glycol, in the presence of toluenesulfonic acid, said toluenesulfonic acid being present in a molar excess in the range of from about 2 to about 10 moles over said ethylene glycol, at a temperature in the range of from about 105° to about 115° C., separating the p,p'-1,2-ditolylethane from isomeric ditolylethanes, and recovering the former compound.

References Cited in the file of this patent

UNITED STATES PATENTS

| | | |
|---|---|---|
| 2,653,979 | Kropa | Sept. 29, 1953 |
| 2,878,260 | Bloch et al. | Mar. 17, 1959 |

FOREIGN PATENTS

| | | |
|---|---|---|
| 354,992 | Great Britain | Aug. 20, 1931 |